United States Patent [19]
Otwell

[11] Patent Number: 5,988,931
[45] Date of Patent: Nov. 23, 1999

[54] MOTOR AND GENERATOR COUPLING DEVICE

[75] Inventor: James L. Otwell, 9446 Summerbell La., Houston, Tex. 77074

[73] Assignee: James L. Otwell

[21] Appl. No.: 08/984,936

[22] Filed: Dec. 4, 1997

[51] Int. Cl.[6] .................................................. H02K 47/04
[52] U.S. Cl. .......................... 403/299; 403/306; 403/356; 464/93; 310/113
[58] Field of Search ..................................... 403/299, 300, 403/301, 306, 355, 356, 182, 187, 1; 411/84, 966; 464/147, 157, 93; 310/75 D, 113

[56] References Cited

U.S. PATENT DOCUMENTS

| | | | |
|---|---|---|---|
| 1,904,745 | 4/1933 | Nowosielski | 310/113 |
| 2,447,198 | 8/1948 | Miller | 310/113 |
| 3,654,775 | 4/1972 | Williams | 464/93 |
| 3,662,568 | 5/1972 | Kashima et al. | 464/93 |

*Primary Examiner*—Lynne H. Browne
*Assistant Examiner*—John R. Cottingham

[57] ABSTRACT

A motor and generator coupling device including a coupler having a generally cylindrical configuration. The coupler has an inner end and an outer end. The outer end has three studs extending outwardly therefrom. The three studs are dimensioned and are aligned for extending within three holes within a drive disc hub of a generator. A circular flange is secured to an outer wall of the generator and is disposed over the inner end of the coupler. A hydraulic motor is secured to the circular flange in communication with the generator.

1 Claim, 2 Drawing Sheets

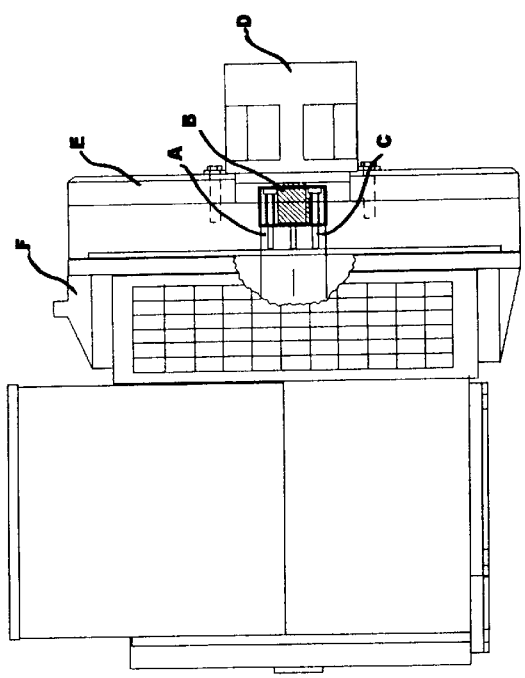
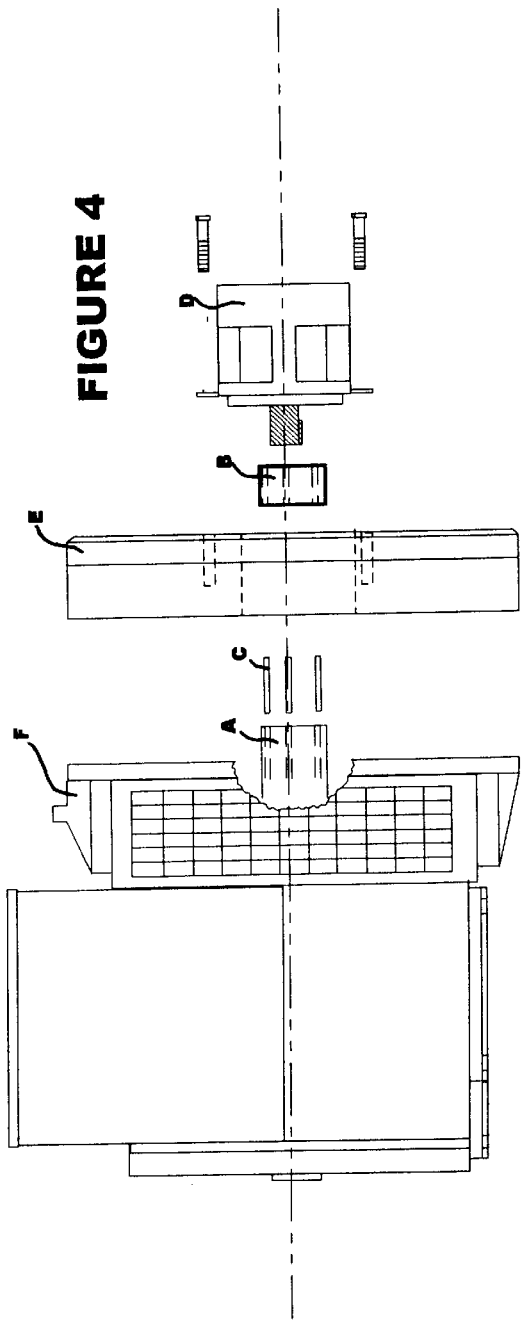

MOTOR AND GENERATOR COUPLING DEVICE

BACKGROUND HE INVENTION

1. Field of the Invention

The present invention relates to a motor and generator coupling device and more particularly pertains to driving single bearing generators with a hydraulic motor with a motor and generator coupling device.

2. Description of the Prior Art

The use of engine couplings is known in the prior art. More specifically, engine couplings heretofore devised and Utilized for the purpose of reducing engine stress are known to Consist basically of familiar, expected and obvious structural Configurations, notwithstanding the myriad of designs encompassed by the crowded prior art which have been developed for the fulfillment of countless objectives and requirements.

By way of example, U.S. Pat. No. 5,303,681 to Crofts; U.S. Pat. No. 4,501,982 to McMinn; and U.S. Pat. No. 4,579,926 to McMinn.

While these devices fulfill their respective, particular objective and requirements, the aforementioned patents do not describe a motor and generator coupling device for driving single bearing generators with hydraulic motor. Prior art either used a shaft, flywheel configuration, or the shaft is bored out by a generator manufacturer.

In this respect, the motor and generator coupling device according to the present invention substantially departs from the convention concepts and designs of the prior art, and in doing so provides an apparatus primarily developed for the purpose of driving single bearing generators with a hydraulic motor.

Therefore, it can be appreciated that there exists a continuing need for new and improved motor and generator coupling device which can be used for driving single bearing generators with a hydraulic motor. In this regard, the present invention substantially fulfills this need.

SUMMARY OF THE INVENTION

In the view of the foregoing disadvantages inherent in the known types of engine couplings now present in the prior art, the present invention provides an improved motor and generator coupling device. As such, the general purpose of the present invention, which will be described subsequently in greater detail, is to provide a new and improved motor and generator coupling device and method which has all the advantages of the prior art and none of the disadvantages.

To attain this, the present invention essentially comprises a coupling having a generally cylindrical configuration. The coupler has an inner end and an outer end. The outer end has three studs extending outwardly therefrom. The three studs are dimensioned and are aligned for extending within three holes within a drive disc hub of a generator. A circular flange is secured to an outer wall of the generator and is disposed over the inner end of the coupling. A hydraulic motor is secured to the circular flange in communication with the generator.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to be details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motor and generator coupling device which has all the advantages of the prior art engine coupling and none of the disadvantages.

It is another object of the present invention to provide a new and improved motor and generator coupling device which may be easily and efficiently manufactured and marketed.

It is a further object of the present invention to provide a new and improved motor and generator coupling device which is of durable and reliable construction.

An even further object of the present invention is to provide a new and improved motor and generator coupling device which is susceptible of a low cost of manufacture with regard to both materials and labor, and which accordingly is then susceptible of low prices of sale to the consuming public, thereby making such a motor and generator device economically available to the buying public.

Even still another object of the present invention is to provide a new and improved motor and generator coupling device for driving single bearing generators with a hydraulic motor.

Lastly, it is an object of the present invention to provide a new and improved motor and generator coupling device including a coupler having a generally cylindrical configuration. The coupler has an inner end and an outer end. The outer end has three studs extending outward therefrom. The three studs are dimensioned and are aligned for extending within three holes within a drive disc hub of a generator. A circular flange is secured to an outer wall of the generator and is disposed over the inner end of the coupler. A hydraulic motor is secured to the circular flange in communication with the generator.

A standard generator shaft can be used without having it machined or bored out, or by using a through stud. The hydraulic motor can be easily removed from the generator without the need of special tools. The present invention can use any hydraulic motor with any shaft configuration. The coupler can be replaced if damaged or needs to be changed because another type motor is used. The motor bearing and generator bearing are aligned allowing for longer bearing life.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention illustrated coupled with the motor and the generator.

FIG. 4 is an axially exploded view of the coupling of FIG. 3 illustrating the interrelation of the various elements of the coupling.

The same reference numerals refer to the same parts through the various figures.

DESCRIPTION OF THE PREFERRED EMBODIMENT

Figure 2:
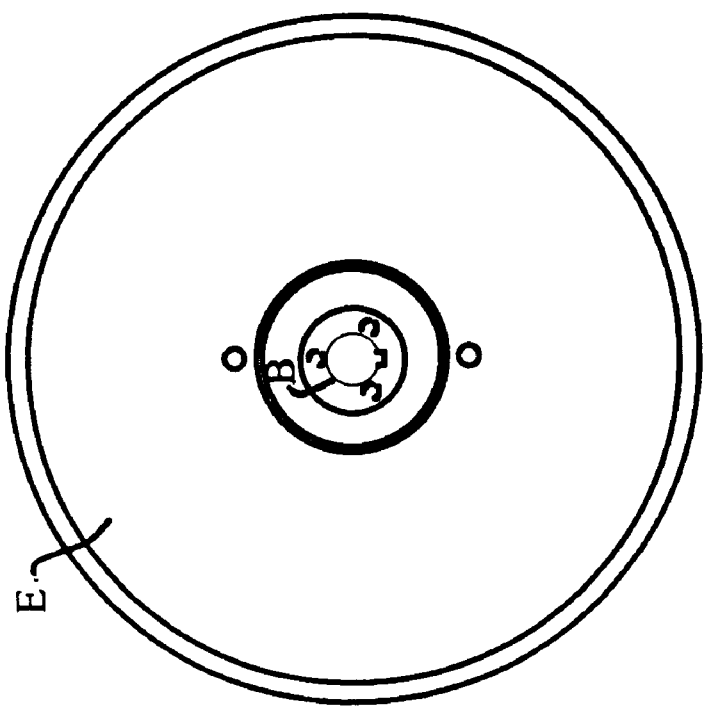
FIG. 2 is a top view of the present invention illustrated in FIG. 1.
Figure 1:
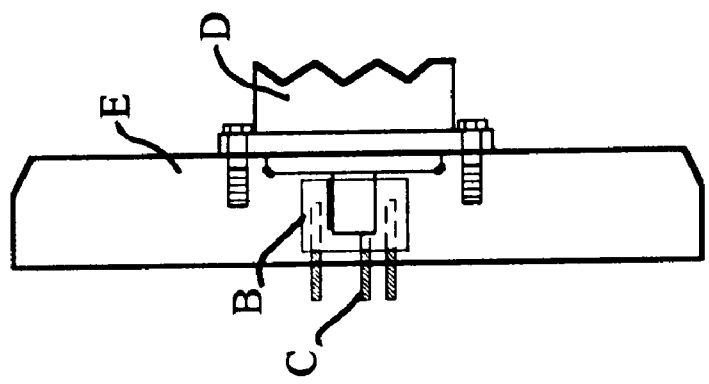
FIG. 1 is a side view of the preferred embodiment of the motor and generator coupling device construction in accordance with the principles of the present invention.

With reference now to be the drawings, and in particular, to FIGS. 1 through 3 thereof, the preferred embodiment of the new and improved motor and generator coupling device embodying the principles and concepts of the present invention will be described.

Specifically, it will be noted in the various Figures that the device relates to a motor and generator coupling device for driving single bearing generators with a hydraulic motor. In its broadest context, the device consist of a coupler. Such components are individually configured and correlated with respect to each other so as to attain the desired objective.

The coupler (B) has a generally cylindrical configuration. The coupler (B) has an inner end and an outer end. The outer end has three studs (C) extending outwardly therefrom. The coupler (B) can be other configurations and can include any number of studs (C). The three studs (C) are dimensioned and are aligned for extending within three holes within a drive disc hub (A) of a generator (F). A circular flange (E) is secured to an outer wall of the generator (F) and is disposed over the inner end of the coupler (B). A hydraulic motor (D) is secured to the circular flange (E) in communication with the generator (F).

The purpose of the coupler (B) is to close couple the motor (D) to a single bearing generator (F). This is accomplished by removing the front bearing if is a two bearing generator along with the flywheel. The circular flange (E) is then bolted to a front housing of the generator (F). The studs (C) are screwed into the existing holes of the drive disc hub (A). The coupler (B) is then bored to match the stud pattern and the shaft of the hydraulic motor (D). The coupler (B) is then placed over the studs (C) and is held in place when the motor (D) is bolted to the circular flange (E). This eliminates the alignment problem occurs when coupling a hydraulic motor to a two bearing generator.

As to the manner of usage and operation of the present invention, the same should be apparent from the above description. Accordingly, no further relating discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A motor and generator coupling device for driving single bearing generators with a hydraulic motor comprising, in combination:

a coupler having a generally cylindrical configuration, the coupler having an inner and outer end, the outer end having three studs extending outwardly therefrom, the three studs dimensioned and being aligned for extending within three holes within a drive disc hub of a generator, the inner end being aligned for extending onto a drive shaft of a motor so as to allow the motor to drive the coupling and the generator, a circular flange is secured to an outer wall of the generator and disposed over the inner end of the coupler, the motor is secured to the circular flange in communication with the generator.

* * * * *